(12) United States Patent
Giraud et al.

(10) Patent No.: US 11,059,459 B2
(45) Date of Patent: Jul. 13, 2021

(54) DEVICE FOR CLEANING AN OPTICAL DETECTION SYSTEM FOR A MOTOR VEHICLE

(71) Applicant: Valeo Systèmes d'Essuyage, Le Mesnil Saint Denis (FR)

(72) Inventors: Frédéric Giraud, Le Mesnil Saint Denis (FR); Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 224 days.

(21) Appl. No.: 16/084,538

(22) PCT Filed: Mar. 8, 2017

(86) PCT No.: PCT/EP2017/055455
§ 371 (c)(1),
(2) Date: Sep. 12, 2018

(87) PCT Pub. No.: WO2017/157739
PCT Pub. Date: Sep. 21, 2017

(65) Prior Publication Data
US 2019/0077378 A1 Mar. 14, 2019

(30) Foreign Application Priority Data
Mar. 14, 2016 (FR) ...................................... 1652128

(51) Int. Cl.
*B60S 1/56* (2006.01)
*G02B 27/00* (2006.01)
(Continued)

(52) U.S. Cl.
CPC ................. *B60S 1/56* (2013.01); *B60S 1/528* (2013.01); *G02B 27/0006* (2013.01); *H04N 5/225* (2013.01)

(58) Field of Classification Search
CPC ........... B60S 1/528; B60S 1/56; H04N 5/225; G02B 27/0006
See application file for complete search history.

(56) References Cited

U.S. PATENT DOCUMENTS

| 10,144,394 B1* | 12/2018 | Rice ........................ B60S 1/481 |
| 2009/0250533 A1* | 10/2009 | Akiyama ................ B60S 1/381 239/284.1 |

(Continued)

FOREIGN PATENT DOCUMENTS

| DE | 10 2005 021671 A1 | 11/2006 |
| WO | 2015/120866 A1 | 8/2015 |

OTHER PUBLICATIONS

International Search Report issued in PCT/EP2017/055455 dated May 16, 2017 (2 pages).

(Continued)

*Primary Examiner* — Benjamin L Osterhout
(74) *Attorney, Agent, or Firm* — Osha Bergman Watanabe & Burton LLP

(57) ABSTRACT

The invention relates to a device for cleaning an optical sensor (2) of an optical detection system for a motor vehicle, said device comprising an assembly for guiding and distributing a cleaning fluid and a drying fluid. Electric motor-driven means (9) are used to move said fluid-guiding and fluid-distributing assembly in a linear movement between a working position in which the fluids can be distributed over an outer surface of the optical sensor (2) and an idle position. Said invention is applicable to motor vehicles.

14 Claims, 2 Drawing Sheets

(51) Int. Cl.
  *H04N 5/225* (2006.01)
  *B60S 1/52* (2006.01)

(56) References Cited

U.S. PATENT DOCUMENTS

| | | | |
|---|---|---|---|
| 2013/0092758 A1* | 4/2013 | Tanaka | B60S 1/52 |
| | | | 239/284.1 |
| 2013/0171514 A1* | 7/2013 | Mio | C07D 327/10 |
| | | | 429/200 |
| 2015/0138357 A1* | 5/2015 | Romack | B60S 1/522 |
| | | | 348/148 |
| 2016/0103316 A1* | 4/2016 | Rousseau | B60R 1/00 |
| | | | 359/509 |
| 2017/0021809 A1* | 1/2017 | Trebouet | B60S 1/0848 |
| 2017/0168291 A1* | 6/2017 | Buss | G02B 27/0006 |
| 2017/0225660 A1* | 8/2017 | Trebouet | A47L 7/0023 |

OTHER PUBLICATIONS

Written Opinion of the International Searching Authority issued in PCT/EP2017/055455 dated May 16, 2017 (5 pages).

* cited by examiner

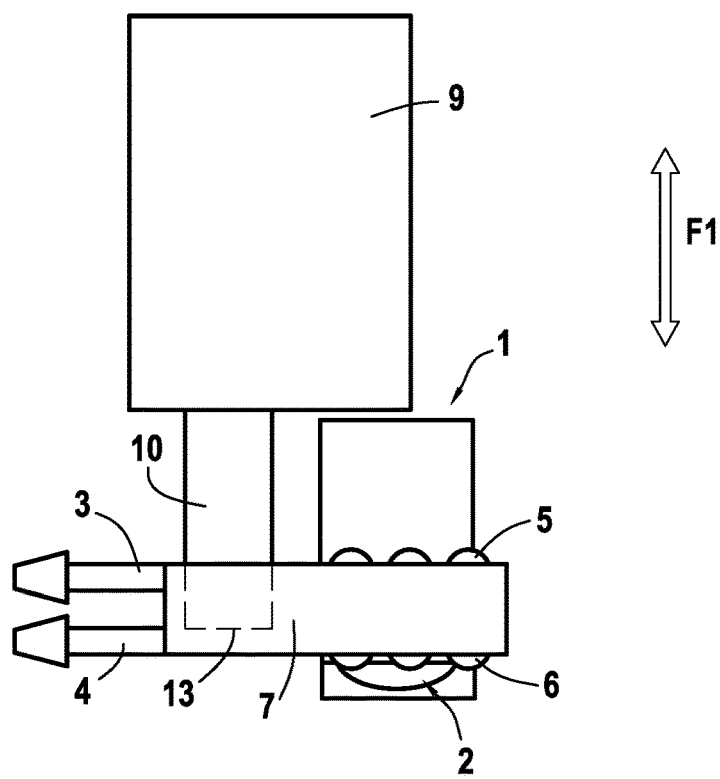
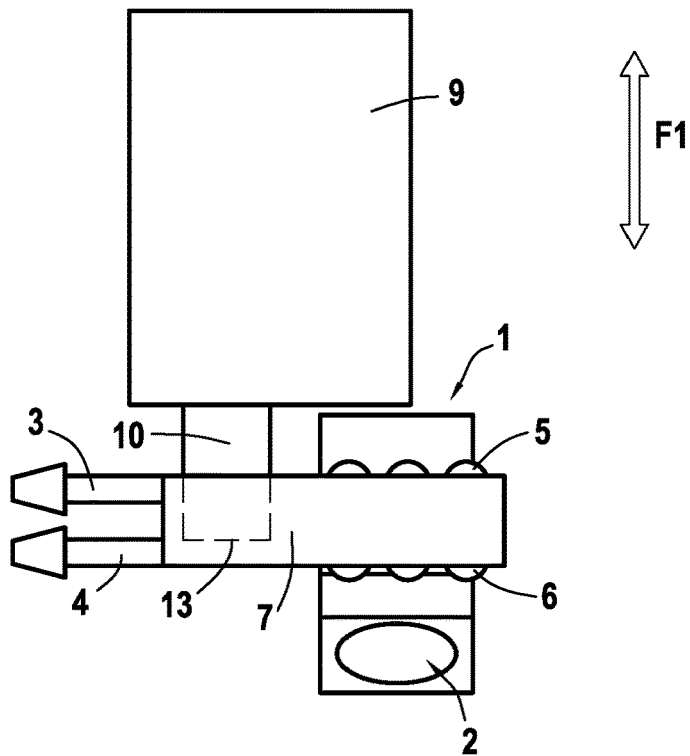

DEVICE FOR CLEANING AN OPTICAL DETECTION SYSTEM FOR A MOTOR VEHICLE

Application PCT/EP2017/055455 claims priority from Application 1652128 filed on Mar. 14, 2016 in France. The entire contents of these applications are incorporated herein by reference in their entirety.

The present invention relates to the field of the optical detection systems used to assist the driver of motor vehicles, and more particularly concerns the devices for cleaning the sensors of these systems.

Optical detection systems equip an increasing number of motor vehicles in order to assist the driver of the vehicle in some driving situations, such as for example assistance with parking using a video camera or an infrared type radar. For these driver assistance devices to be as effective as possible, it is essential that the optical sensors of these detection systems are clean, whether that be the lens of a video camera or some other type of optical sensor, for example laser sensors (commonly termed LIDAR) or other sensors based on the emission and/or the detection of light in the spectrum visible or invisible to man, in particular the infrared spectrum.

It is known to place in the vicinity of these optical sensors a cleaning device able to spray a particular quantity of cleaning liquid onto the associated optical sensor just before imaging or detection is performed. In order to prevent all risk of pollution of the sensor in question by possible traces that any such cleaning liquid might leave behind (droplets, runs, etc.), it is also known, after spraying the cleaning fluid, to spray a drying fluid, notably air, which enables the optical sensor to be cleared of the cleaning liquid and residual soiling, which the latter then entrains with it. Clearly these cleaning devices must nevertheless not impede the operation of the sensor through being in the field of view of the sensor when the latter is operating.

To this end, the elements for distributing cleaning and/or drying fluids can generally be moved between a working position in which they come to be placed substantially in front of the optical sensor to clean it and an idle position in which they are retracted relative to the sensor so as not to impede its operation. Moreover, these devices must be as compact as possible to address overall size constraints within the restricted space of the vehicle receiving the driver assistance device.

An object of the present invention is to propose a solution that makes it possible to facilitate the installation of this kind of optical detection assembly and the associated device for cleaning its optical sensor and that enables simple guidance of this cleaning device between the working and idle positions.

To this end, the invention proposes a device for cleaning an optical sensor of an optical detection system for a motor vehicle, which comprises an assembly for guiding and distributing a cleaning fluid and a drying fluid. According to the invention, the cleaning device includes electric motor-driven means for moving this fluid guiding and distributing assembly with a linear movement between a working position, in which the fluids can be distributed over an exterior surface of the optical sensor, and an idle position.

The electric motor-driven means have an output drive shaft fastened to the fluid guiding and distributing assembly, said drive shaft being moved linearly and therefore able to transmit to the guiding and distributing assembly this movement in translation generated by the electric motor-driven means. According to different embodiments, the electric motor-driven means may consist either in a linear actuator, said drive shaft then consisting in an output rod of the actuator moved directly in translation, or in a rotary motor, said drive shaft then consisting in a rack actuated by a pinion fastened to a rotor of said motor.

There may be provided a series of features, separately or in combination, appropriate to the configuration of a cleaning device in which the fluid guiding and distributing assembly, which comprises at least one connecting end-piece for feeding each of the fluids and distribution pipes to one or more nozzles for spraying these fluids, is accommodated in a casing that is configured to cooperate with the drive shaft.

This casing may in particular include a zone for fixing the drive shaft, a distribution part, carrying at least one fluid spray nozzle, and a supply part, carrying at least one connection end-piece and at least one distribution pipe.

The fixing zone may form an extension of the casing offset relative to the passage for the at least one distribution pipe, and in particular offset on same side of the casing on which is arranged the at least one fluid spray nozzle.

According to features of the invention relating to this fixing zone, the latter may include a notch with shapes and dimensions corresponding to those of the section of the drive shaft. The notch may be a blind notch, and may be of rectangular shape corresponding to a rectangular shape of the section of the drive shaft.

According to different embodiments of the invention, this electric motor may be a linear output motor or a rotary output motor in which the output shaft is connected to a rack, thus transforming the movement in rotation of the output shaft of the motor into a linear movement.

It is clear that the linear movement that enables the guiding and distributing assembly to be moved into the working position, so that the nozzles for spraying the cleaning and/or drying fluids are in front of the optical sensor to be cleaned, may be directed in accordance with different directions with respect to the vehicle, without this modifying the operation of the cleaning device according to the invention.

The electric motor-driven means may comprise a stepper motor that is controlled to generate a movement over only the distance between the working position and the idle position, or may comprise a DC motor, end of travel abutments being provided to correspond to the working and idle positions of the fluid guiding and distributing assembly.

The invention also concerns an optical detection system for a motor vehicle, comprising at least one optical sensor and a device for cleaning that sensor as just described.

Other features, details and advantages of the invention will emerge more clearly on reading the description given hereinafter by way of illustration and with reference to the appended figures, in which:

FIGS. 1 and 2 are diagrammatic side views of an optical detection system and an associated cleaning device in accordance with one embodiment of the invention, the cleaning device being shown in a working position (FIG. 1) and in a rest position (FIG. 2);

Figure 3:
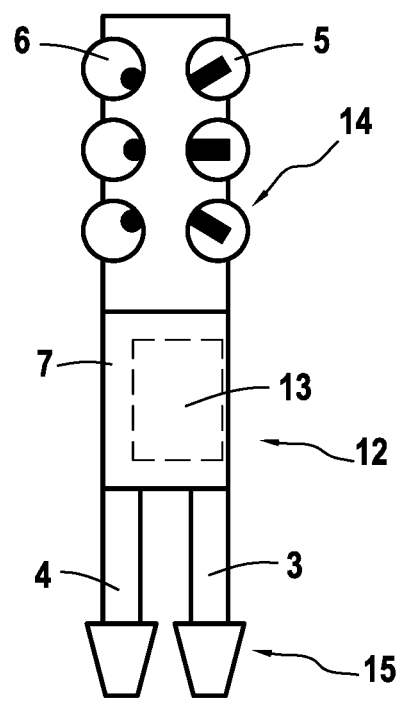
FIG. 3 is a side view, from the opposite viewing angle to FIGS. 1 and 2, of a cleaning and/or drying fluid guiding and injection assembly of the cleaning device shown in FIG. 1.

It should first be noted that although the figures serve to explain the invention in detail for the purposes of its execution, they can of course serve to define the invention better if necessary.

Moreover, the invention is described hereinafter in its application to an optical detection system comprising an imaging video camera equipped with a lens. As indicated above, the invention is not limited to this application, however, and extends to any vehicle optical detection system using at least one optical sensor such as, by way of non-exhaustive example: laser sensors, sensors based on the emission and/or the detection of radiation in the visible or invisible spectrum.

FIGS. 1 and 2 show diagrammatically an optical detection system associated with a cleaning device produced in accordance with a first embodiment of the invention, the optical detection system here including a video camera 1 equipped with a lens 2.

This optical detection system is associated with a device for cleaning the lens 2, formed in particular by an assembly for guiding and distributing a cleaning fluid and a drying fluid. This guiding and distributing assembly more particularly features connection end-pieces 3 and 4 to supply pipes, not shown here, respectively for guiding a cleaning liquid from a storage tank, not shown, and for guiding a drying fluid, and features a set of first spray nozzles 5, for spraying the cleaning liquid, and a set of second spray nozzles 6, for spraying a drying fluid. The cleaning liquid and the drying fluid circulate inside a casing 7 of the guiding and distributing assembly, in distribution pipes 8 that feed the nozzles, the pipes being represented in dashed line in FIG. 4. The spray nozzles 5 and 6 are arranged in the vicinity of each other on the same face of the casing, at a first longitudinal end of the latter, opposite the second longitudinal end where the connection end-pieces 3 and 4 are located.

The casing 7 is made mobile to move between a working position, more particularly shown in FIG. 1, in which the fluids sprayed by the spray nozzles 5 and 6 are able to reach an exterior surface of the lens 2, and an idle position, shown in FIG. 2, in which the spray nozzles are retraced relative to the lens 2 and in which the casing 7 can advantageously be retracted into a body element of the vehicle. Clearly no fluid is sprayed in the direction of the lens when the casing 7, and the associated spray nozzles 5 and 6, are in their idle position, in particular when this idle position is a position retracted into the body of the vehicle.

According to the invention, the movement of the casing 7 and the movement of the guiding and distributing assembly constituted of the connection end-pieces 3 and 4, the spray nozzles 5 and 6 and the distribution pipes 8, is a linear movement produced by electric motor-driven means 9. As shown in FIGS. 1 and 2, the passage of the casing 7 and of the associated guiding and distributing assembly, from a working position to an idle position, is effected by a movement in translation of the electric motor-driven means toward or away from each other. This therefore limits the space needed around the cleaning device for it to be able to move from its active position to its idle position.

The electric motor-driven means 9 are controlled by a control device, which sends an instruction to start up the electric motor-driven means when information relating to the use of the optical detection system is received, whether that use is a future use, or a past use. In other words, information as to imminent use of the optical detection system, of the type indicating stopping the vehicle and passing from the corresponding gear to reverse, or information as to end of use of the optical detection system, may trigger use of the motor-driven means to clean the optical sensor, before or after its use. Without an activation instruction, the cleaning and drying fluid guiding and distributing assembly remains in an idle position, and the electric motor-driven means are not energized. This results in a limited energy requirement for this function since the cleaning operations are episodic and rapid.

It is clear that use in accordance with the present invention of electrical systems enables detection of immobilization of the system to be facilitated, notably in the event of freezing up. The associated control system can therefore simultaneously cut off the supply to the systems used, namely the motor-driven means but also the pump for example, which has the advantage of not forcing the components of the system.

Different variant embodiments may be employed in the context of the use in accordance with the invention of electric motor-driven means generating a linear movement of the associated guiding and distributing assembly.

Variants may notably relate to the type of motor. There may interchangeably be used a rotary electric motor or a linear electric motor, provided that the drive shaft 10, at the output of the electric motor-driven means 9, executes a linear movement that it transmits to the casing 7. In the case of a linear electric motor, the casing is mounted directly on the output shaft, whereas in the case of a rotary electric motor, the casing is mounted on a rack that forms the drive shaft, the movement of which is rendered linear by a toothed connection with a rod connected to the rotor of the motor.

Other variants may relate to the mode of operation of the motor and in particular its timing. To be more precise, the linear movement may advantageously be obtained by an electric motor of the stepper type. A motor of this kind is rated to produce a particular movement of the drive shaft at the output of the motor, between two extreme positions, it being understood that a first extreme position of the drive shaft corresponds to the idle position of the fluid guiding and distributing assembly 3, 4, 5, 6, 7, 8, and that a second extreme position of the drive shaft corresponds to the working position of this assembly. A variant embodiment may include a DC motor, associated with end of travel abutments, that sends end of travel information to the control module of the electric motor in order to shut off its supply.

In each of these cases, the linear movement of the casing 7 is generated by the linear movement of the drive shaft 10 in the direction of the arrow F1 shown in FIGS. 1 and 2.

According to an advantageous feature of the invention, the casing 7 is fixed directly to the sliding drive shaft 10 at the output of the electric motor 9. To this end, the casing 7 includes a fixing zone 12 carrying a notch 13 with shapes and dimensions corresponding to those of the section of the drive shaft 10. In particular, this notch 13 may assume a rectangular shape, in which is housed the drive shaft, also of rectangular section, which enables prevention of rotation of the casing relative to the drive shaft around the sliding axis of this shaft.

Figure 4:
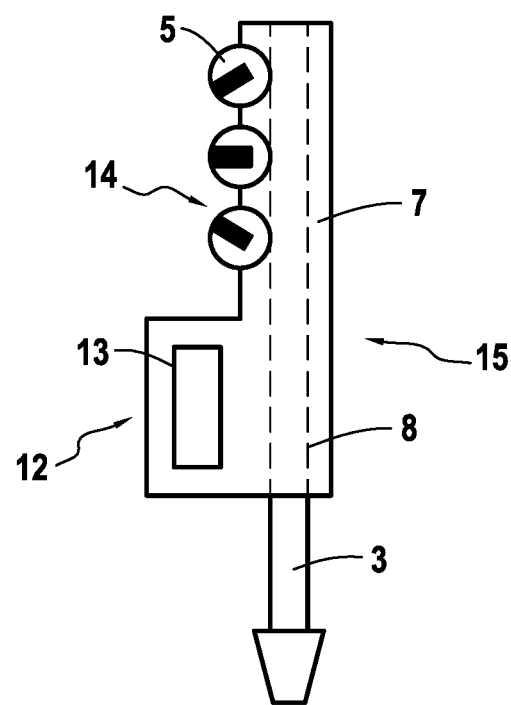
FIG. 4 is a view from above showing guiding and injection of the cleaning and/or drying fluid in the cleaning device shown in FIG. 3.

It may more particularly be noted that the casing includes a plurality of separate parts including a first distribution part 14, carrying spray nozzles 5 and 6, a second part corresponding to the fixing zone 12, and a third or supply part 15 carrying connection end-pieces 3 and 4 and distribution pipes 8 represented in dashed line in FIG. 4.

The fixing zone 12 forms an extension offset relative to the passage for the fluid distribution pipes, and here in particular offset to the side of the casing 7 on which the respective fluid spray nozzles 5 and 6 are arranged on this casing. Accordingly, the flow of fluids in the distribution pipes 8, coming from the connection end-pieces 3 and 4, is not disturbed by the presence of the notch 13 of the fixing zone 12 and by the possible presence of the drive shaft 10 in this notch. It is, of course, to be noted that an embodiment of this kind is not exclusive: generally speaking, the invention provides for the fixing of the casing 7 with the drive shaft at the output of the electric motor 9 that produces the linear movement of this assembly (whether it is a linear output shaft or a rack associated with a rotary output shaft) to be defined in such a manner that it does not cause any disturbance of the flow of these fluids.

The shaft may be a force-fit in or screwed into this notch 13, shown here as a blind notch. A through-opening could be provided instead and in place of a notch, and again fixing means could be provided adequate to transmit to the casing 7 the linear movement of the drive shaft.

As has just been described, the invention provides a simple means of producing a compact and effective device for positioning the cleaning device of an optical sensor of an optical detection system installed on a motor vehicle.

As mentioned above, although the invention has been described and shown here in its application to an optical assembly employing an imaging video camera, it should not be regarded as limited to this application, and extends to any detection assembly employing an optical sensor. Similarly, the invention should not be regarded as limited to the means and configurations described and shown, but also extends to all equivalent means or configurations and to any combination of such means.

The invention claimed is:

1. A device for cleaning an optical sensor of an optical detection system for a motor vehicle, comprising:
   an assembly for guiding and distributing a cleaning fluid and a drying fluid; and
   an electric motor for moving the assembly with a linear movement between a working position in which the cleaning fluid and the drying fluid are distributed over an exterior surface of the optical sensor and an idle position.

2. The device as claimed in claim 1, wherein the electric motor comprises an output drive shaft fastened to the assembly, the output drive shaft configured to be moved linearly.

3. The device as claimed in claim 2, wherein the electric motor consists of a linear actuator, the output drive shaft consisting of an output rod of the actuator.

4. The device as claimed in claim 2, wherein the electric motor consists of a rotary motor, the output drive shaft consisting of a rack actuated by a rod fastened to a rotor of said motor.

5. The device as claimed in claim 4, wherein the assembly, which comprises at least one connecting end-piece for feeding each of the cleaning fluid and the drying fluid through at least one distribution pipe to one or more nozzles for spraying the cleaning fluid and the drying fluid, is accommodated in a casing that is configured to cooperate with the output drive shaft.

6. The device as claimed in claim 5, wherein the casing includes a zone for fixing the output drive shaft, a distribution part, carrying at least one of the one or more nozzles, and a supply part, carrying at least one connection end-piece and the at least one distribution pipe.

7. The device according to claim 6, wherein the fixing zone forms an extension of the casing offset relative to a passage for the at least one distribution pipe.

8. The device as claimed in claim 7, wherein the fixing zone is offset on the side of the casing on which is arranged the at least one of the one or more nozzles.

9. The device as claimed in claim 8, wherein the fixing zone includes a notch with shapes and dimensions corresponding to those of a section of the output drive shaft.

10. The device as claimed in claim 9, wherein the notch is a blind notch.

11. The device as claimed in claim 9, wherein the notch is of rectangular shape corresponding to a rectangular shape of the section of the output drive shaft.

12. The device as claimed in claim 1, wherein the electric motor comprises a stepper motor.

13. The device as claimed in claim 1, wherein the electric motor comprises a DC motor, end of travel abutments being provided to correspond to the working and idle positions of the assembly.

14. An optical detection system for motor vehicles, comprising:
   at least one optical sensor; and
   the device as claimed in claim 1 for cleaning the at least one optical sensor.

* * * * *